(12) United States Patent
Hamers et al.

(10) Patent No.: US 11,034,086 B2
(45) Date of Patent: Jun. 15, 2021

(54) APPARATUS FOR PRODUCING AN OBJECT BY MEANS OF ADDITIVE MANUFACTURING AND METHOD OF USING THE APPARATUS

(71) Applicant: ADDITIVE INDUSTRIES B.V., Eindhoven (NL)

(72) Inventors: Martijn Robert Hamers, Eindhoven (NL); Rob Peter Albert Van Haendel, Eindhoven (NL); Mark Herman Elise Vaes, Eindhoven (NL)

(73) Assignee: Additive Industries B.V., Eindhoven (NL)

( * ) Notice: Subject to any disclaimer, the term of this patent is extended or adjusted under 35 U.S.C. 154(b) by 132 days.

(21) Appl. No.: 16/332,976

(22) PCT Filed: Sep. 18, 2017

(86) PCT No.: PCT/NL2017/050610
§ 371 (c)(1),
(2) Date: Mar. 13, 2019

(87) PCT Pub. No.: WO2018/052297
PCT Pub. Date: Mar. 22, 2018

(65) Prior Publication Data
US 2019/0270245 A1    Sep. 5, 2019

(30) Foreign Application Priority Data

Sep. 16, 2016  (NL) ...................................... 2017473

(51) Int. Cl.
*B29C 64/20* (2017.01)
*B29C 64/153* (2017.01)
(Continued)

(52) U.S. Cl.
CPC ............ *B29C 64/20* (2017.08); *B29C 64/153* (2017.08); *B33Y 10/00* (2014.12); *B33Y 30/00* (2014.12)

(58) Field of Classification Search
CPC .............................. B29C 64/20; B29C 64/153
See application file for complete search history.

(56) References Cited

U.S. PATENT DOCUMENTS

| 2006/0208396 A1* | 9/2006 | Abe ..................... B22F 3/1055 264/497 |
| 2007/0037509 A1 | 2/2007 | Renz et al. |

(Continued)

FOREIGN PATENT DOCUMENTS

| CN | 105150531 A | 12/2015 |
| CN | 205033598 U * | 2/2016 |

(Continued)

OTHER PUBLICATIONS

International Search Report and Written Opinion for WO 2018/052297 (International Application No. PCT/NL2017/050610) dated Jan. 4, 2018; 9 pages.

*Primary Examiner* — Joseph S Del Sole
*Assistant Examiner* — Jerzi H Moreno Hernandez
(74) *Attorney, Agent, or Firm* — Suiter Swantz pc llo

(57) ABSTRACT

Apparatus for producing an object by means of additive manufacturing, comprising: a process chamber for receiving on a build surface of a build plate a bath of powdered material which can be solidified; a support for positioning said build plate in relation to a surface level of said bath of powdered material; a solidifying device for solidifying a selective part of said material; and a homing device for moving said build surface, by said support, to a home position such that said object can be build on said build surface of said build plate, wherein said homing device comprises a homing member which can be displaced along (Continued)

said build surface of said build plate, wherein said homing device is designed for moving said build surface to said home position until a measured force for displacing said homing member is within a pre-determined range. Method for producing an object by means of additive manufacturing.

4 Claims, 1 Drawing Sheet

(51) Int. Cl.
　　　*B33Y 10/00*　　　(2015.01)
　　　*B33Y 30/00*　　　(2015.01)

(56) References Cited

U.S. PATENT DOCUMENTS

| | | |
|---|---|---|
| 2015/0231831 A1 | 8/2015 | Ei-Siblani |
| 2016/0144429 A1* | 5/2016 | Mizutani ............... B22F 3/1055 |
| | | 425/78 |
| 2017/0136704 A1* | 5/2017 | Giulietti ............... B29C 64/141 |

FOREIGN PATENT DOCUMENTS

| | | |
|---|---|---|
| CN | 205033598 U | 2/2016 |
| NL | 2017473 B1 | 3/2018 |
| WO | 2015077195 A2 | 5/2015 |
| WO | 2018052297 A1 | 3/2018 |

\* cited by examiner

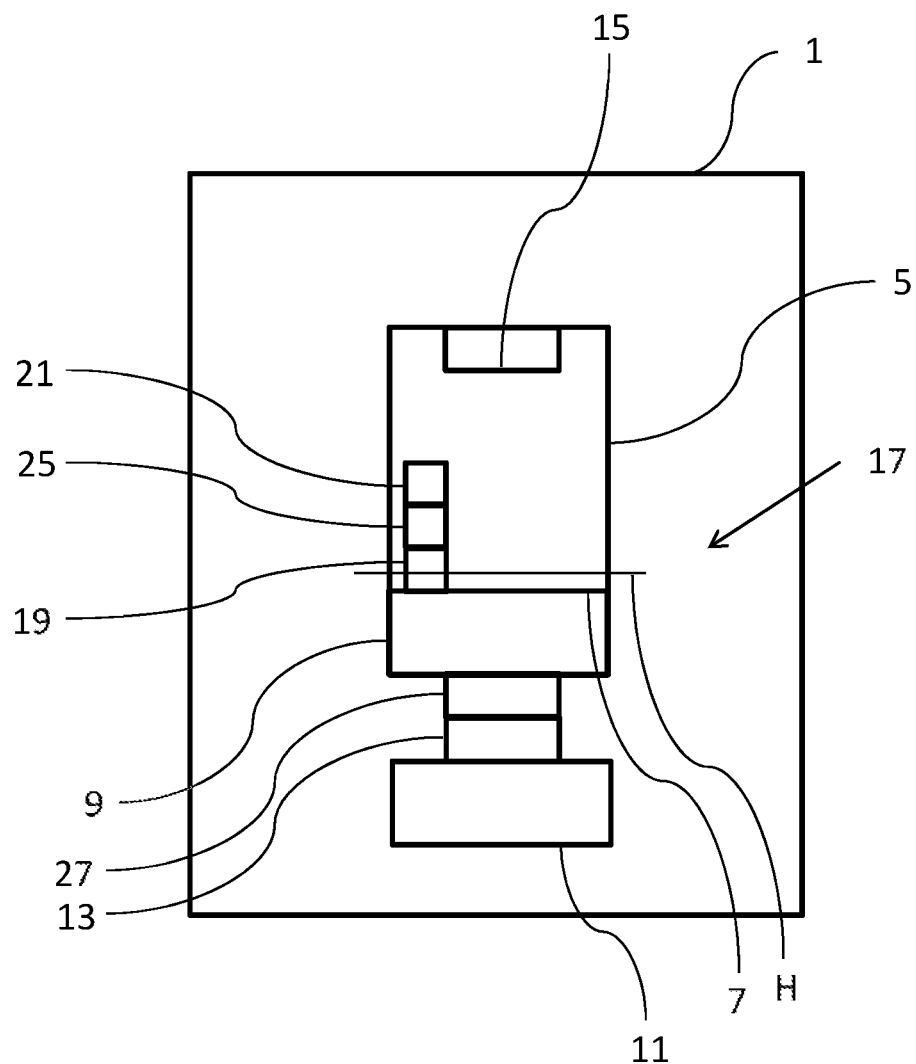

APPARATUS FOR PRODUCING AN OBJECT BY MEANS OF ADDITIVE MANUFACTURING AND METHOD OF USING THE APPARATUS

CROSS REFERENCE TO RELATED PATENT APPLICATIONS

This application claims the benefit of and priority to International Application No. PCT/NL2017/050610 filed Sep. 18, 2017 which claims priority from NL 2017473 filed Sep. 16, 2016.

TECHNICAL FIELD AND BACKGROUND OF THE INVENTION

According to a first aspect the invention relates to an apparatus for producing an object by means of additive manufacturing.

According to a second aspect the invention relates to a method of producing an object by means of additive manufacturing on a build surface of a build plate, using an apparatus according to the first aspect.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to built the 3D object from a series of cross sections. These layers, which correspond to the virtual cross sections from the CAD model, are during this process joined or fused at the same time to create the final 3D object.

One of the challenges in the manufacturing of three dimensional objects, in particular in additive manufacturing of metal objects, is achieving a desired accuracy of the manufactured object. According to prior art practice, an object is manufactured on a build plate, wherein the object is joined to the build plate through solidification of material used to build the object. A drawback of this practice is a relative large variation in force required to separate the object from the build plate.

BRIEF SUMMARY OF THE INVENTION

It is therefore an object of the invention to provide an apparatus for producing an object by means of additive manufacturing, having a reduced variation in force required to separate a manufactured object from the build plate.

Thereto, the invention provides an apparatus according to claim 1. The apparatus comprises, a process chamber for receiving a bath of material which can be solidified, in particular a bath of powdered material that can be solidified in order to make metal products. A support is provided for positioning the build plate in relation to the surface level of the bath of material. A solidifying device, such as a laser device, for solidifying a layer of the material on the surface, in particular by means of electromagnetic radiation, is provided. To reduce the variation of separation force a homing device is provided comprising a homing member that is formed by a recoating device, such as a wiper, which can be displaced along the surface of the bath of powdered for levelling the surface of the bath and along the build surface of the build plate. According to the invention the variation of separation force is reduced by moving the build surface, by the support, to a home position. Moving the build surface to the home position allows for an increased accuracy of a height of the bath of powdered material on the build surface of the build plate before starting manufacturing of an object. An increased accuracy of a height results in a more accurate solidification at the build surface, thereby reducing the variation of separation force required for removing the object from the build surface.

In an advantageous embodiment of the apparatus said home position comprises a substantially flat reference plane, wherein said homing device comprises a tilting device for tilting said build surface to a position wherein said build surface is substantially parallel to said substantially flat reference plane in dependence of said measured force for displacing said homing member. Such an embodiment is beneficial for realizing a reduced variation of separation force of the object along the build surface. A reduced variation along the surface of the object reduces the risk of local damaging the object upon removing the object from the build surface.

It is beneficial if said measured force for displacing said homing member is a driving torque of an actuator for displacing said homing member along said build surface of said build plate. Measuring a driving torque of an actuator such as an electromotor is a relative reliable way of determining the force for moving the homing member across the build surface.

According to a second aspect the invention relates to a method of producing an object by means of additive manufacturing on a build surface of a build plate, using an apparatus according to the first aspect of the invention. The method comprises the steps of:

displacing said homing member along said build surface of said build plate;

measuring said force for displacing said homing member;

moving said build surface to said home position until said measured force for displacing said homing member is within a pre-determined range. The advantages of the method according to the second aspect of the invention are analogue to the benefits of the apparatus according to the first aspect of the invention.

In an embodiment of the method is advantageous if during said step of measuring said force, said force is measured at least at two locations along said build surface, wherein during said step of moving said build surface to said home position said build surface is tilted towards said substantially flat reference plane in dependence of said force measured at said at least two locations.

BRIEF DESCRIPTION OF THE FIGURES

An embodiment of the invention will be described in the following wherein:

DETAILED DESCRIPTION OF THE INVENTION

FIG. 1 is a schematic overview of an apparatus according to the present invention for additive manufacturing an object.

FIG. 1 shows an overview of an apparatus 1 for producing an object by means of additive manufacturing. The apparatus 1 comprises a process chamber 5 for receiving a bath of powdered material which can be solidified. The bath of powdered material is receivable on a build surface 7 of a build plate 9. The build plate 9 may be positioned in relation to a substantially flat reference plane H and the bath of material via support 13. The support 13 is movably provided in a shaft 11, such that after solidifying a layer, the support 13 may be lowered, and a further layer of material may be solidified on top of the part of the object already formed. A tilting device 27 is provided for tilting the build surface 7 towards the substantially flat reference plane H. A solidifying device 15 is provided for solidifying a selective part of the material. In the embodiment shown, the solidifying device 15 is a laser device, which is arranged for producing electromagnetic radiation in the form of laser light, in order to melt a powdered material provided on the support 13, which then, after cooling forms a solidified part of the object to be produced. However, the invention is not limited to the type of solidifying device.

The apparatus 1 comprises a homing device 17 for moving the build surface 7 to a home position before building object. The homing device 17 is provided with a homing member 19 which can be displaced along the build surface 7. The homing member 19 is formed by a recoating device, such as a wiper, which can be displaced along the surface of the bath of powdered for levelling the surface of the bath and along the build surface 7 of the build plate 9. A force detection device 21 is provided for measuring a force for displacing the homing member 19 along the build surface 7. The force detection device 21 measures the torque of the actuator 25 for moving the homing member 19 along the build surface 7. The torque of the actuator 25 is measured at least at two locations of the homing member 19 along the build surface 7.

In case the forces measured by the force detection device 21 measured at the at least two locations are substantially equal but below the pre-determined force range, the build surface 7 is moved upwards in the process chamber 5 towards the reference plan H until the measured forces are within the pre-determined range. Should the measured forces both be above the pre-determined force-range, the build surface is moved downward in the process chamber 5 until the measured forces are within the pre-determined force range. When the forces measured at the at least two locations are not substantially equal the build surface 7 is tilted using the tilting device 27 to move the build surface 7 to a position wherein the build surface 7 is substantially parallel to the reference plane H.

The invention claimed is:

1. Apparatus (1) for producing an object by means of additive manufacturing, comprising:
   a process chamber (5) for receiving on a build surface (7) of a build date (9) a bath of powdered material configured to be solidified;
   a support (13) for moving the said build surface (7) to a home position such that said object can be built on said build surface (7) of said build plate (9) and for positioning said build plate (9) in relation to a surface level of said bath of powdered material;
   a solidifying device (15) for solidifying a selective part of said powdered material; and
   a homing device (17) comprising a homing member (19), an actuator (25) configured to displace the homing member (19) along the build surface (7), a force detection device associated with the actuator (25) configured for measuring a force required for displacing said homing member (19) along said build surface (7), and a tilting device (27) for tilting said build surface (7):
   wherein said home position comprises a substantially flat reference plane (H);
   wherein said tiling device (27) is configured for tilting said build surface (7) to a position where said build surface (7) is substantially parallel to said substantially flat reference plane (H) in dependence of said measured force for displacing said homing member (19);
   wherein said support is configured for moving said build surface (7) to said home position until the measured force by the force detection device is within a pre-determined range; and
   wherein said homing member (19) is formed by a recoating device configured to be displaced along the surface of the bath of powdered material for levelling the surface of the bath and along the build surface (7) of the build pate (9).

2. Apparatus (1) according to claim 1, wherein said measured force for displacing said homing member (19) is a torque of the actuator (25) for displacing said homing member (9) along said build surface (7) of said build plate (9).

3. Method of producing an object by means of additive manufacturing on a build surface (7) of a build plate (9), the method comprises the steps of:
   using an apparatus (1) according to claim 1;
   displacing said homing member (19) along said build surface (7) of said build plate (9);
   measuring said force for displacing said homing member (19);
   moving said build surface (7) to said home position until said measured force for displacing said homing member (19) is within the pre-determined range.

4. Method according to claim 3, wherein dining said step of measuring said force, said force is measured at least at two locations along said build surface (7), wherein during said step of moving said build surface (7) to said home position said build surface (7) is tilted towards said substantially flat reference plane (H) in dependence of said force measured at said at least two locations.

* * * * *